E. PORTER.
Churn.

No. 69,934.

Patented Oct. 15, 1867.

Witnesses
W. H. Burridge
E. E. Waite

Inventor.
Edward Porter

United States Patent Office.

EDWARD PORTER, OF TALLMADGE, OHIO.

Letters Patent No. 69,934, dated October 15, 1867.

---

IMPROVEMENT IN CHURNS.

---

The Schedule referred to in these Letters Patent and making part of the same.

---

TO ALL WHOM IT MAY CONCERN:

Be it known that I, EDWARD PORTER, of Tallmadge, in the county of Summit, and State of Ohio, have invented certain new and useful improvements in Churns, being an improvement on a patent granted to me June 4, 1864; and I do hereby declare that the following is a full and complete description of the same; the said improvement relating to the construction and arrangement of the beaters.

Like letters refer to like parts in the views.

Figure 1:
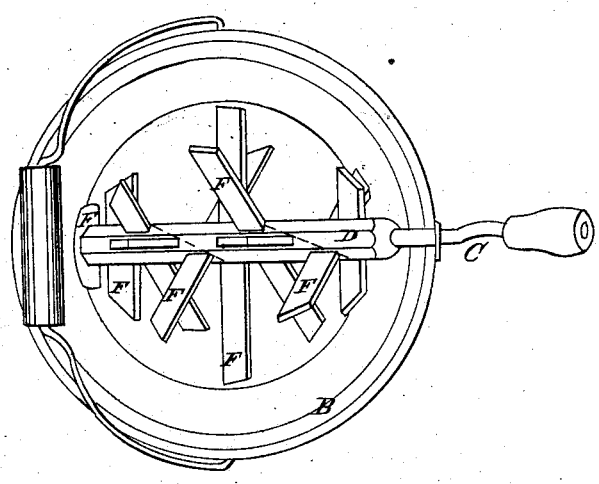
Figure 1 is a view of the inside of the churn from the top.
Figure 2:
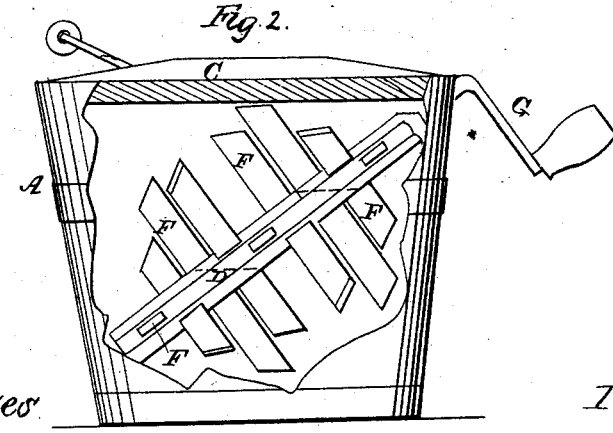
Figure 2 is a side view of the inside.

A, fig. 1, represents the body of the churn, which consists of an ordinary wooden pail, around on the inner side of the brim of which is cut a continuous rabbet, B, fig. 1, in which is fitted a cover, C. In this pail or churn is arranged a shaft, D, the lower end of which is secured in a step, E, placed in the angle of the side and bottom, while the upper end is fitted in a notch cut in the brim, so as to bring the journal below the rabbet and cover. The position of the shaft when in place is shown in fig. 2, which, it will be seen, is diagonal from the top to the bottom. This shaft is provided with a series of arms or cream-beaters, F, more or less in number, and so arranged on the shaft as to wind around it, as indicated by the dotted lines $a$, fig. 1.

The practical operation of this churn is as follows: The cream, on being thrown into the churn, and the cover put on it, is then agitated by the beaters, operated by the crank G. Owing to spiral direction given to the beaters, they follow each other in regular succession, thereby striking the cream throughout its entire mass, from the top to the bottom, thus thoroughly agitating and beating it so that the butter is soon brought, and in the greatest possible quantity.

This churn is extremely simple in its construction, easily operated and cleaned, and when not required for the purpose of churning, the body or pail can be used for other purposes.

What I claim as my improvement, and desire to secure by Letters Patent, is—

The special arrangement of the radial arms F and shaft D, in combination with the pail A, in the manner as and for the purpose described.

EDWARD PORTER.

Witnesses:
 W. H. BURRIDGE,
 FRANK S. ALDEN.